US006276961B1

(12) United States Patent
Reynolds

(10) Patent No.: US 6,276,961 B1
(45) Date of Patent: Aug. 21, 2001

(54) ACCESSORY PANEL COMPATIBLE WITH AT LEAST TWO DISPARATE TYPES OF MOUNTING ARRANGEMENTS

(75) Inventor: Douglas S. Reynolds, Clinton, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/427,803

(22) Filed: Oct. 27, 1999

(51) Int. Cl.[7] .................................................. H01R 13/60
(52) U.S. Cl. ......................... 439/536; 439/668; 439/544; 439/545
(58) Field of Search ................................. 439/536, 668, 439/544, 545, 563, 564, 573

(56) References Cited

U.S. PATENT DOCUMENTS 5,913,701 * 6/1999 Olson et al. ........................ 439/668

* cited by examiner

*Primary Examiner*—Gary F. Paumen
*Assistant Examiner*—Alexander Gilman
(74) *Attorney, Agent, or Firm*—Woodcock Washburn Kurtz McKiewicz & Norris LLP

(57) ABSTRACT

An accessory panel for use in an internal bay of a computer is compatible with at least two disparate types of mounting arrangements for such panels. The accessory panel comprises a face plate, a mounting plate, and a sub-frame. The sub-frame includes a side plate and a rear plate. The mounting plate is fixedly coupled to the face plate. One or more bores are disposed along a surface of the mounting plate. The bores are arranged in a pattern that corresponds to a pattern of mounting-holes on a framework that surrounds a particular type of computer bay. The bores provide a means for mounting the panel in this type of computer bay through the use of fasteners. The side and rear plates are coupled to the mounting plate when the panel is installed in a computer bay that accommodates peripheral devices through the use of mounting rails. Once coupled, the mounting plate and the side plate provide a substantially smooth, coplanar area on which a mounting rail can be disposed.

14 Claims, 11 Drawing Sheets

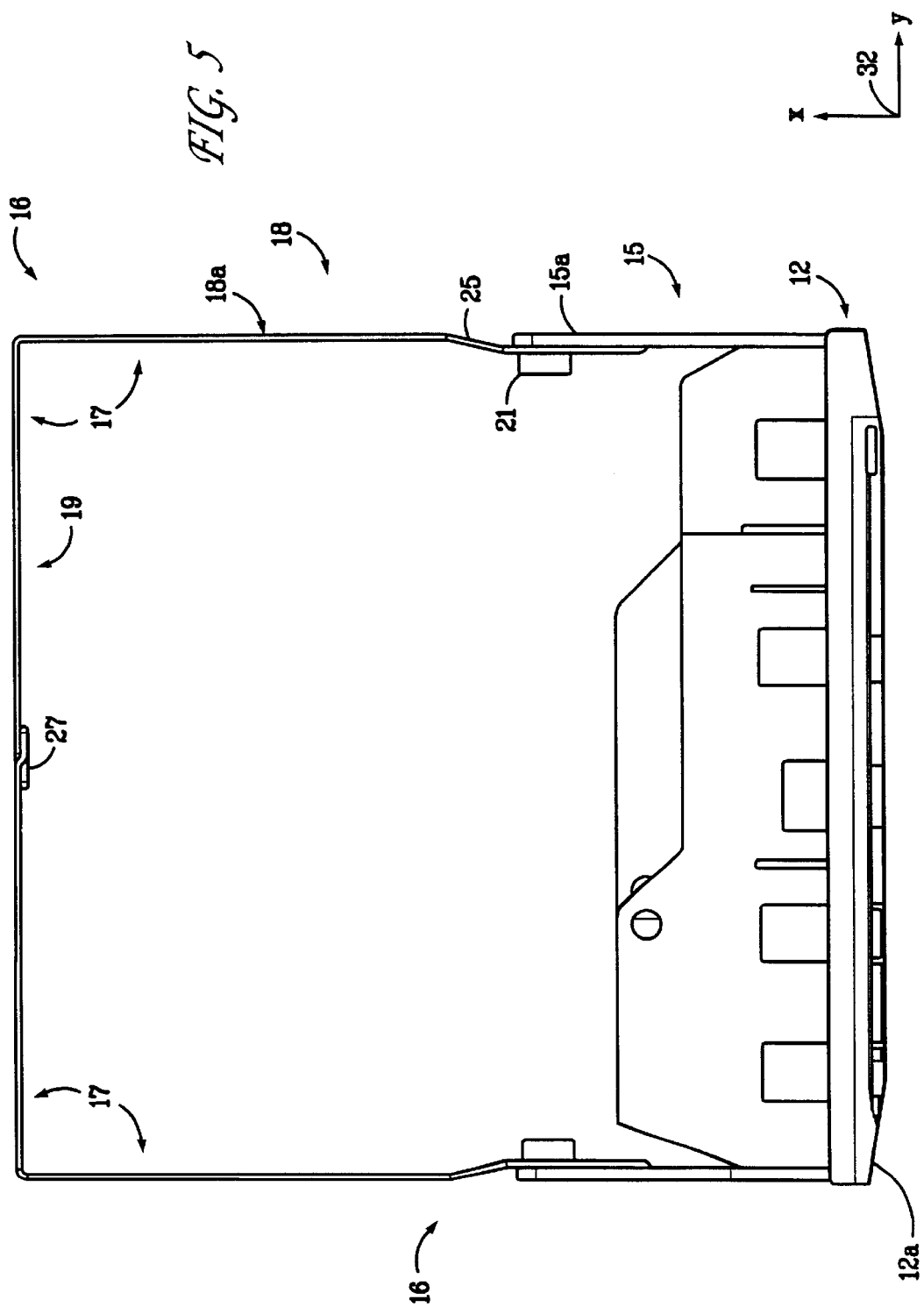

ACCESSORY PANEL COMPATIBLE WITH AT LEAST TWO DISPARATE TYPES OF MOUNTING ARRANGEMENTS

FIELD OF THE INVENTION

The invention relates to an accessory panel for use in a computer bay. More particularly, the invention relates to an accessory panel that is compatible with at least two disparate types of arrangements for mounting a peripheral device in such a bay.

BACKGROUND OF THE INVENTION

Desk-top computers often used in conjunction with so-called "peripheral devices." Peripheral devices perform activities that supplement the computing functions carried out by the computer's microprocessor. For example, disk-drive units that store and retrieve data from removable data-storage media are a common type of peripheral device. Accessory panels are another common type of peripheral device. Accessory panels furnish a means for a computer to interface with other electronic devices, e.g., audio and video systems, other computers, peripheral devices external to the computer, etc. Accessory panels typically comprise a face plate, one or more electrical jacks disposed on the face plate, and a means for mounting the panel so that the face plate is readily accessible to the computer user.

Peripheral devices, when housed within the computer itself, are usually mounted in discrete areas known as "bays." A typical computer bay is defined by the casing and internal framework of the computer within which the bay is disposed. Desk-top computers commonly include one or more so-called "5¼-inch" bays (the term "5¼-inch" is recognized by skilled artisans as a designation for a particular type of computer bay; the term does not necessarily represent an exact dimension of the bay).

Two standard arrangements are utilized to mount peripheral devices in the bays of desktop computers. One arrangement involves fastening the peripheral device directly to the internal framework of the computer using fasteners such as bolts or screws. Mounting plates are typically affixed to opposing ends of the face plate. The mounting plates are usually oriented at right angles in relation to the face plate. Mounting holes or bores are disposed along the surface of each mounting plate, in an arrangement that matches a corresponding set of mounting holes in the computer's framework. The accessory panel is installed in the bay by aligning the mounting holes in the framework with the mounting holes in the mounting plates, and inserting fasteners through the aligned holes.

Another common arrangement for mounting peripheral devices in computer bays involves the use of rails affixed to the sides of the peripheral device. These rails operate in conjunction with slots disposed along substantially an entire length of the computer bay. The rails slidably engage the slots as the peripheral device is inserted into the bay. The rails are typically restrained by some type of locking means, e.g., a detent, located at an end of each slot.

Common accessory panels do not have elongated sides that can readily accommodate mounting rails. Hence, a rail-mounted accessory panel must comprise some sort of extension or framework that provides a means for coupling the mounting rails to the accessory panel.

The substantial differences in the above-noted mounting arrangements prevent commonly-used accessory panels from being directly interchangeable between computers that utilize different mounting arrangements. Hence, switching an accessory panel between two such computers typically requires some type of hardware reconfiguration. Furthermore, configuring a new, out-of-the-box accessory panel for one arrangement or the other also requires some type of hardware assembly or disassembly, in general.

Configuring an accessory panel for a particular mounting arrangement typically involves the removal or installation of screws, bolts, clamps, or other external fasteners. (The term "external fastener," as used throughout the specification, refers to a fastening means that is not integral to one or both of the objects being coupled by the fastening means). Hence, configuring the accessory panel can require a substantial expenditure of time and labor. Additionally, configuring a particular accessary panel may be beyond the capability of an average computer user, depending on the complexity of the process. Furthermore, the use of external fasteners increases the parts count of the panel and its corresponding mounting hardware. Reliance on external fasteners also heightens the opportunity for parts to become lost, misplaced, or mispackaged. Furthermore, tooling of some type is usually required to install and remove external fasteners. This requirement further complicates the configuration process.

Hence, a need exists for an accessory panel that is compatible with both of the standard arrangements utilized to mount peripheral devices in the bays of desk-top computers. Configuring the panel for one mounting arrangement or the other should be possible with a minimal expenditure of labor and time. Furthermore, the configuration process should be of minimal complexity, thereby allowing an average computer user to perform the process without encountering substantial difficulties. Additionally, the parts count of the panel and its installation hardware should be low so as to minimize production costs and the potential for lost or misplaced parts. The present invention is directed to these and other goals.

SUMMARY OF THE INVENTION

An object of the present invention is to provide an accessory panel that is compatible with at least two disparate types of mounting arrangements in a computer bay. A presently-preferred embodiment of the accessory panel includes a face plate and a mounting plate coupled to the face plate. The mounting plate comprises a bore and a first aperture. The bore is adapted to receive a fastener when the accessory panel is configured for a first type of mounting arrangement. The first aperture is adapted to receive a sub-frame when the accessory panel is configured for the second type of mounting arrangement.

A preferred embodiment of the accessory panel comprises the sub-frame. The sub-frame is removably coupled to the mounting plate when the accessory panel is configured for the second type of mounting arrangement. The sub-frame preferably includes a first tab and a second aperture, and the mounting plate preferably comprises a projection. The first tab is disposed in the first aperture, and the projection is disposed within the second aperture when the accessory panel is configured for the second type of mounting arrangement.

A preferred embodiment of the sub-frame comprises a first and a second sub-frame member. The first and the second sub-frame members are removably coupled when the accessory panel is configured for the second type of mounting arrangement. The first sub-frame member preferably comprises a second tab. The second tab removably engages the second sub-frame member when the first and the second sub-frame members are removably coupled. The second sub-frame member preferably comprises a third tab. The third tab removably engages the first sub-frame member when the first and the second sub-frame members are removably coupled. Preferably, the first and the second sub-frame members each comprise a side plate and a rear plate disposed at a relative angle of about 90 degrees.

Another object of the present invention is to provide a method for configuring an accessory panel for installation in a bay of a computer. A preferred method comprises the steps of removably coupling a first sub-frame member to a first mounting plate, removably coupling a second sub-frame member to a second mounting plate, and removably coupling the first and the second sub-frame members.

The method preferably includes the steps of inserting a first tab disposed on the first sub-frame member through an aperture disposed on a first mounting plate, and pivoting the first sub-frame member until a surface of the first mounting plate lies substantially flush with a first surface of the first sub-frame member. A preferred method further comprises the steps of inserting a second tab disposed on a second sub-frame member through an aperture disposed on a second mounting plate, and pivoting the second sub-frame member until a surface of the second mounting plate lies substantially flush with a first surface of the second sub-frame member. A preferred method also includes the steps of engaging a third tab disposed on a second surface of the first sub-frame member with a second surface of the second sub-frame member. A preferred method includes the further step of engaging a fourth tab disposed on a second surface of the second sub-frame member with a second surface of the first sub-frame member.

BRIEF DESCRIPTION OF THE DRAWINGS

The foregoing summary, as well as the following detailed description of a presently-preferred embodiment, is better understood when read in conjunction with the appended drawings. For the purposes of illustrating the invention, there is shown in the drawings an embodiment that is presently preferred, it being understood, however, that the invention is not limited to the specific methods and instrumentalities disclosed. In the drawings:

FIG. 5 is a top view of the jack panel shown in FIGS. 1 and 3:

DESCRIPTION OF PREFERRED EMBODIMENTS

The present invention provides an accessory panel that is compatible with at least two disparate types of mounting arrangements. A presently-preferred embodiment of the invention is described herein. The disclosed embodiment comprises an electrical jack panel for use in a 5¼-inch bay of a desk-top computer. This embodiment is presented for exemplary purposes only. Accordingly, the invention should not be limited to the particular embodiment described herein, as the invention may be applied to other types of accessory panels for use in other types of computer bays.

Figure 1:
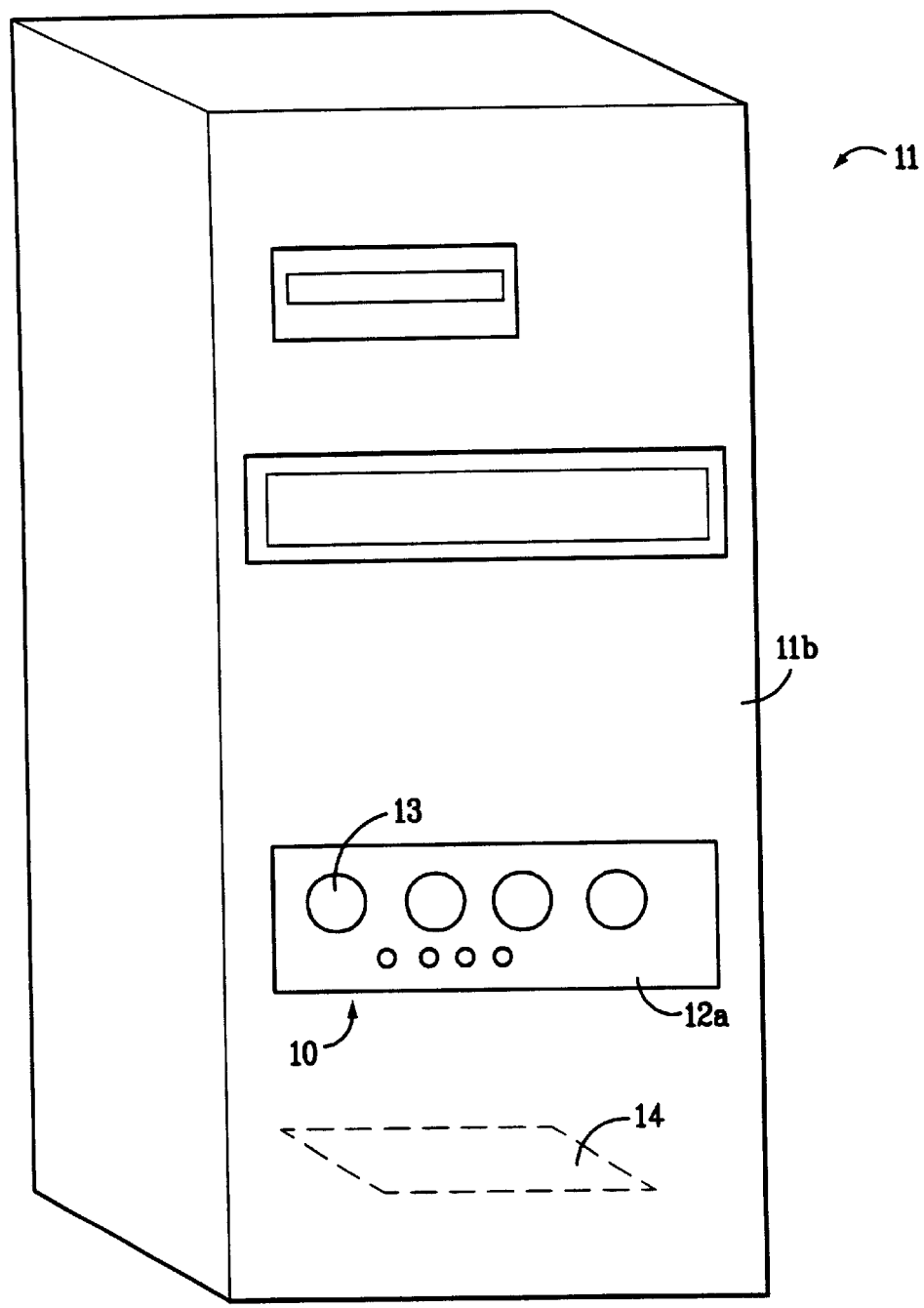
FIG. 1 is a diagrammatical perspective view of an electrical jack panel in accordance with the present invention mounted in a desk-top computer.
Figure 2:
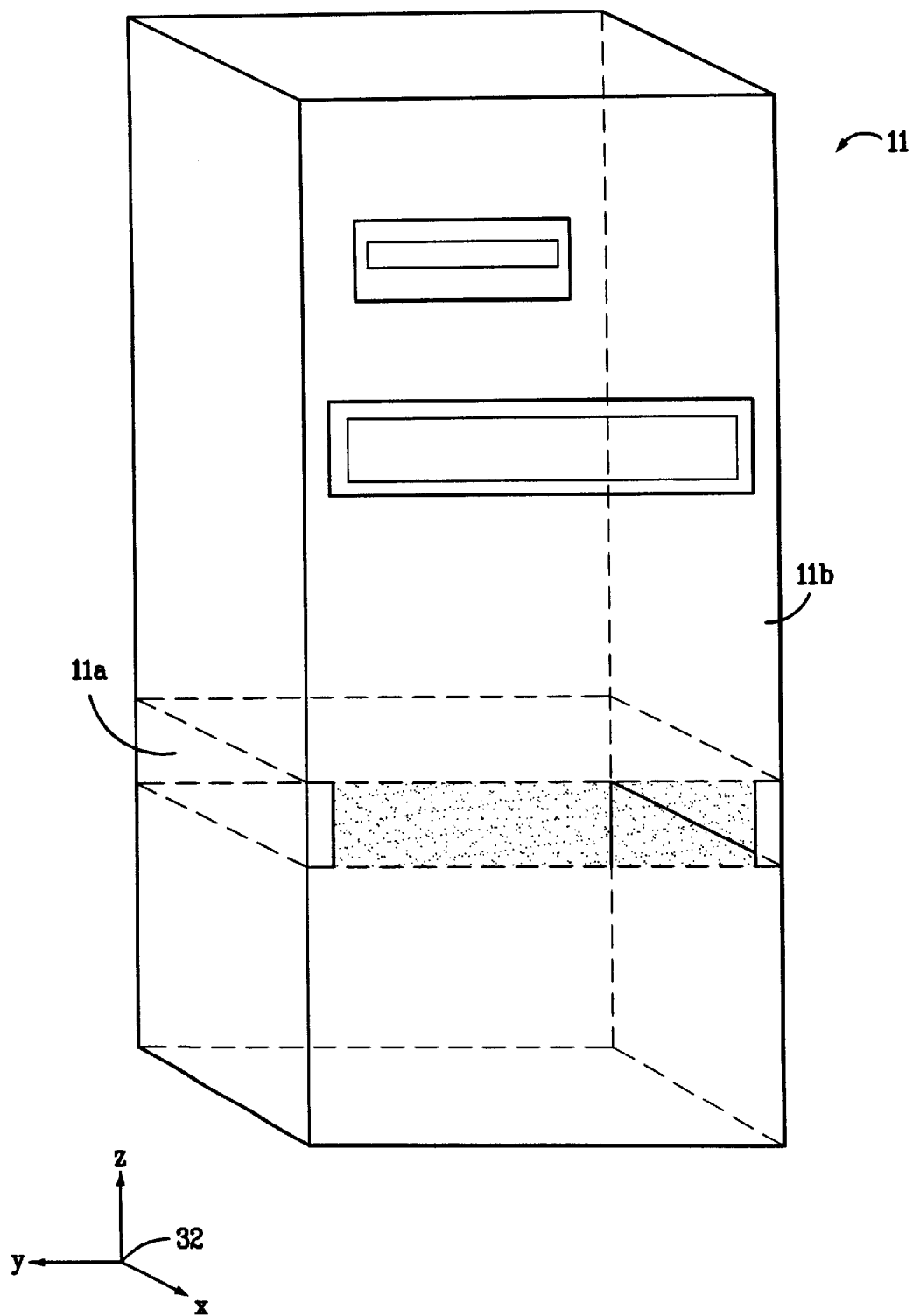
FIG. 2 is a perspective view of the desk-top computer shown FIG. 1.

FIG. 1 illustrates an electrical jack panel 10 in accordance with the present invention. Jack panel 10 is mounted in an internal 5¼-inch bay 11a of a desk-top computer 11. Bay 11a is shown in phantom in FIG. 2. FIGS. 3 through 11 illustrate jack panel 10 and its component parts in various states of assembly. The illustrations are referenced to a common coordinate system 32 denoted in each figure.

Jack panel 10 comprises a face plate 12. Face plate 12 is disposed along a front surface 11b of computer 11 when panel 10 is mounted in computer 11. Panel 10 further comprises a plurality of electrical jacks 13 disposed along an outer surface 12a of face plate 12.

In the exemplary embodiment, electrical jacks 13 are utilized to transmit video and audio signals between computer 11 and various electronic devices such as camcorders, cameras, and video displays. More particularly, jacks 13 transmit video and audio signals between the noted devices and a combined video processing and peripheral interface card 14 mounted within computer 11 (card 14 is shown in phantom in FIG. 1). Card 14 is described in pending U.S. patent application Ser. No. 08/876,560 (Stephenson et al.) filed Jun. 16, 1997, which is hereby incorporated by reference in its entirety. Card 14 is electrically coupled to a peripheral component interconnect bus (not shown) of computer 11. (Card 14 is referenced for illustrative purposes only; jack panel 10 can be utilized to transmit other types of electrical signals between other types of electrical components.)

Jack panel 10 is compatible with the two standard arrangements by which peripheral devices are commonly mounted in computer bays such as bay 11a, i.e., rail mounting and frame mounting. Jack panel 10 comprises face plate 12, a first and a second mounting plate 15, and a sub-frame 16. The height (z dimension) and width (y dimension) of face plate 12 are about equal the height and width of bay 11a. Face plate 12 is preferably manufactured from a plastic material. Mounting plates 15 and sub-frame 16 are preferably formed from sheet metal, e.g., zinc-coated mild steel having a thickness of about 0.5 mm.

Mounting plates 15 are fixedly coupled to opposing ends of face plate 12, in the orientation shown in the figures. Mounting plates 15 may be coupled to face plate 12 by conventional means such as integral molding, glue, bolts, screws, etc. Mounting plates 15 are substantially identical, with the exception that plates 15 are reversed with reference to the x axis, i.e., plates 15 form mirror images with respect to the x axis. Each mounting plate 15 comprises an aperture 20. Aperture 20 is shown in detail in FIG. 8. A recess 20a is disposed along an outer surface 15a of mounting plate 15, proximate aperture 20.

A plurality of projections 21 are disposed along an inner surface 15b of each mounting plate 15. Preferably, projections 21 have an oval cross-section. Projections 21 having other cross-sectional shapes, e.g., circular, are also within the contemplated scope of the invention. Each mounting plate 15 preferably includes two projections 21. Projections 21 are preferably aligned with respect to the vertical (z) axis.

Projections 21 each comprise a bore 22. Bore 22 spans the entire length (y dimension) of projection 21 in the exemplary embodiment; bore 22 may span only a portion of the length of projection 21 in alternative embodiments of the invention. Bore 22 extends through the adjoining surface of mounting plate 15 (see, e.g., FIGS. 3 and 7). Hence, bore 22 extends continuously through mounting plate 15 and at least a portion of projection 21. Bores 22 are not threaded in the exemplary embodiment; threaded bores 22 may be utilized, however, in alternative embodiments of the invention.

Figure 7:
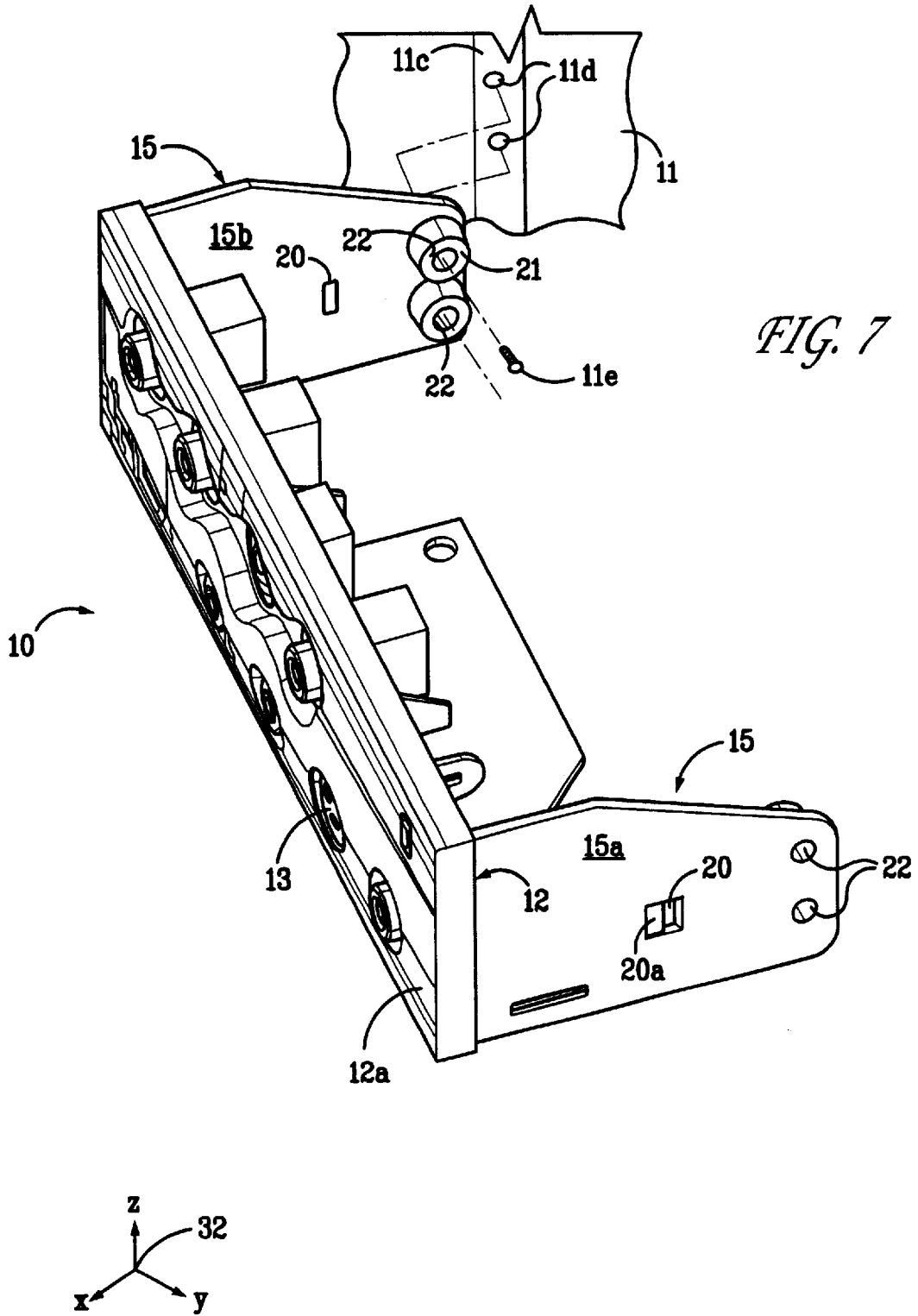
FIG. 7 is a top perspective view of the jack panel shown in FIGS. 1, 3, 5, and 6, with a sub-frame of the panel removed.
Figure 8:
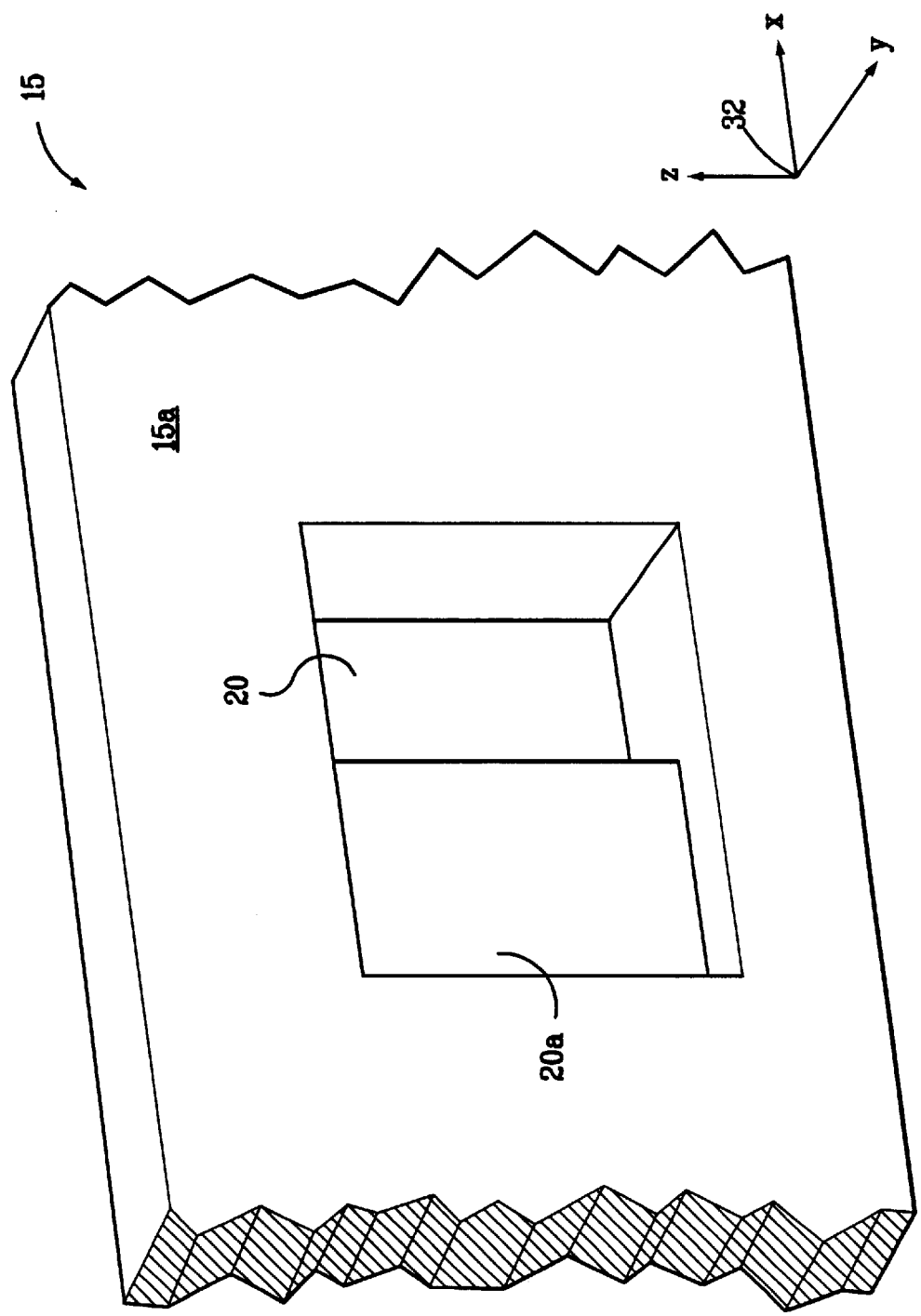
FIG. 8 is a perspective view of a slot in a mounting plate of the jack panel shown in FIGS. 1, 3 and 5–7.

Jack panel 10 may be mounted within bay 11 a using an internal framework 11c of the computer 11 (see FIG. 7). The installation process for this type of mounting arrangement is as follows. Projections 21 are disposed on mounting plates 15 such that the relative positions of bores 22 match a pattern of mounting holes 11d in framework 11c. Panel 10 is mounted to framework 11c by aligning bores 22 with mounting holes 11d and installing a fastener 11e, e.g., a bolt and nut, in each adjoining bore 22 and mounting hole 11d. Sub-frame 16 is not utilized when jack panel 10 is mounted in this manner.

Sub-frame 16 is employed when jack panel 10 is configured for a rail-mount installation. In particular, mounting plates 15 and sub-frame 16 are interconnected in a manner that forms a framework upon which mounting rails 34 are disposed. (For clarity, a single mounting rail 34 is shown in diagrammatical form in FIG. 3). Structural and functional details of sub-frame 16 are as follows.

Figure 4B:
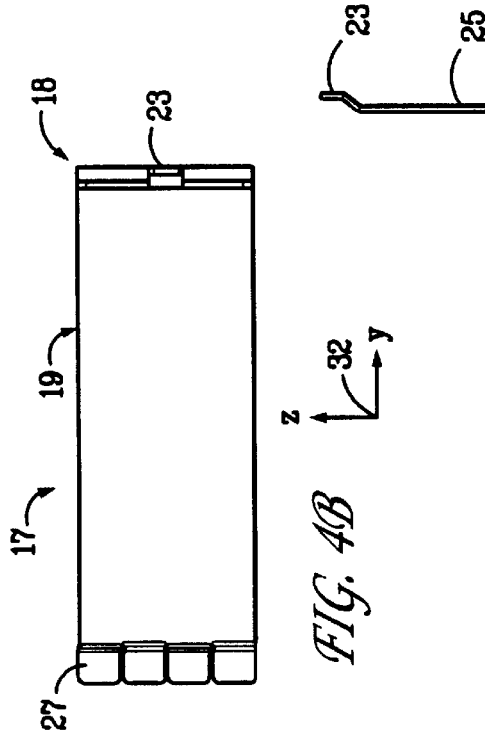
FIG. 4B is a rear view of the sub-frame member shown in FIG. 4A.
Figure 4D:
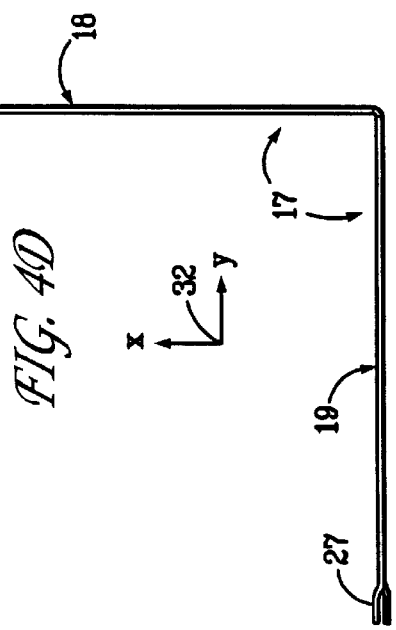
FIG. 4D is a top view of the sub-frame member shown in FIG. 4A–4C.
Figure 4A:
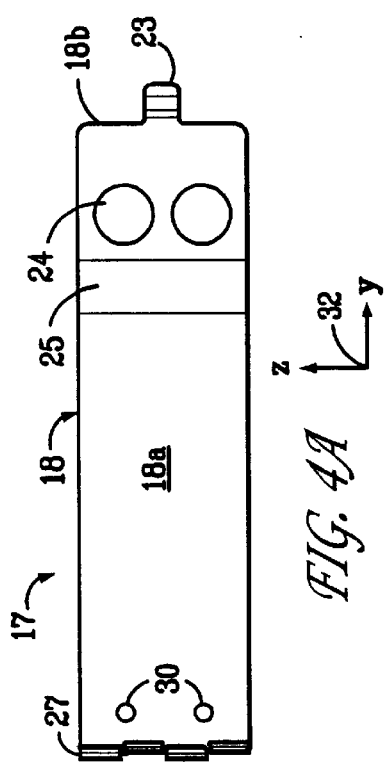
FIG. 4A is a side view of a sub-frame member of the jack panel shown in FIGS. 1 and 3.
Figure 4C:
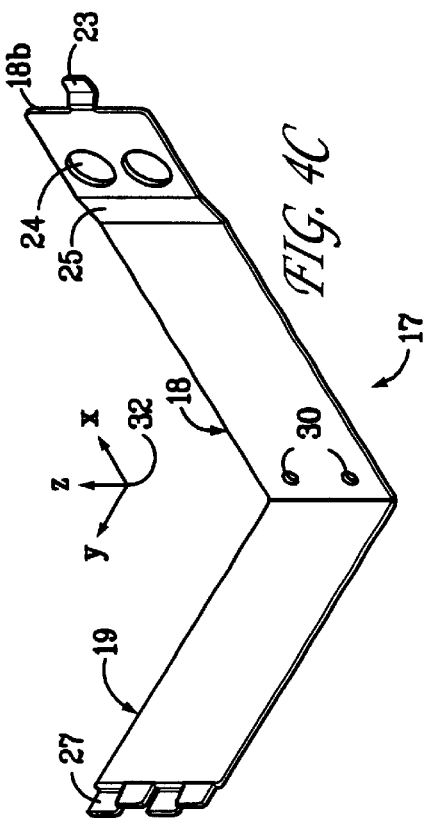
FIG. 4C is a bottom perspective view of the sub-frame member shown in FIGS. 4A and 4B.

Sub-frame 16 comprises two sub-frame members 17. Sub-frame members 17 are identical and interchangeable. Members 17 each comprise a side plate 18 and a rear plate 19. Side plate 18 is fixedly coupled to rear plate 19. Plates 18 and 19 may be joined by conventional means such as welding or brazing. Alternatively, plates 18 and 19 can be stamped from a single piece of sheet metal. Side plate 18 and rear plate 19 are preferably oriented at a relative angle of about 90 degrees, as is best shown in FIGS. 4D and 5.

A tab 23 is disposed along a forward edge 18b of each side plate 18. Furthermore, a series of apertures 24 are disposed in side plate 18, proximate tab 23. The shape and dimensions of apertures 24 are substantially the same as the shape and dimensions of the outer circumference of projection 21. Each side plate 18 further comprises an angled portion 25. Angled portion 25 is disposed proximate apertures 24.

Figure 3:
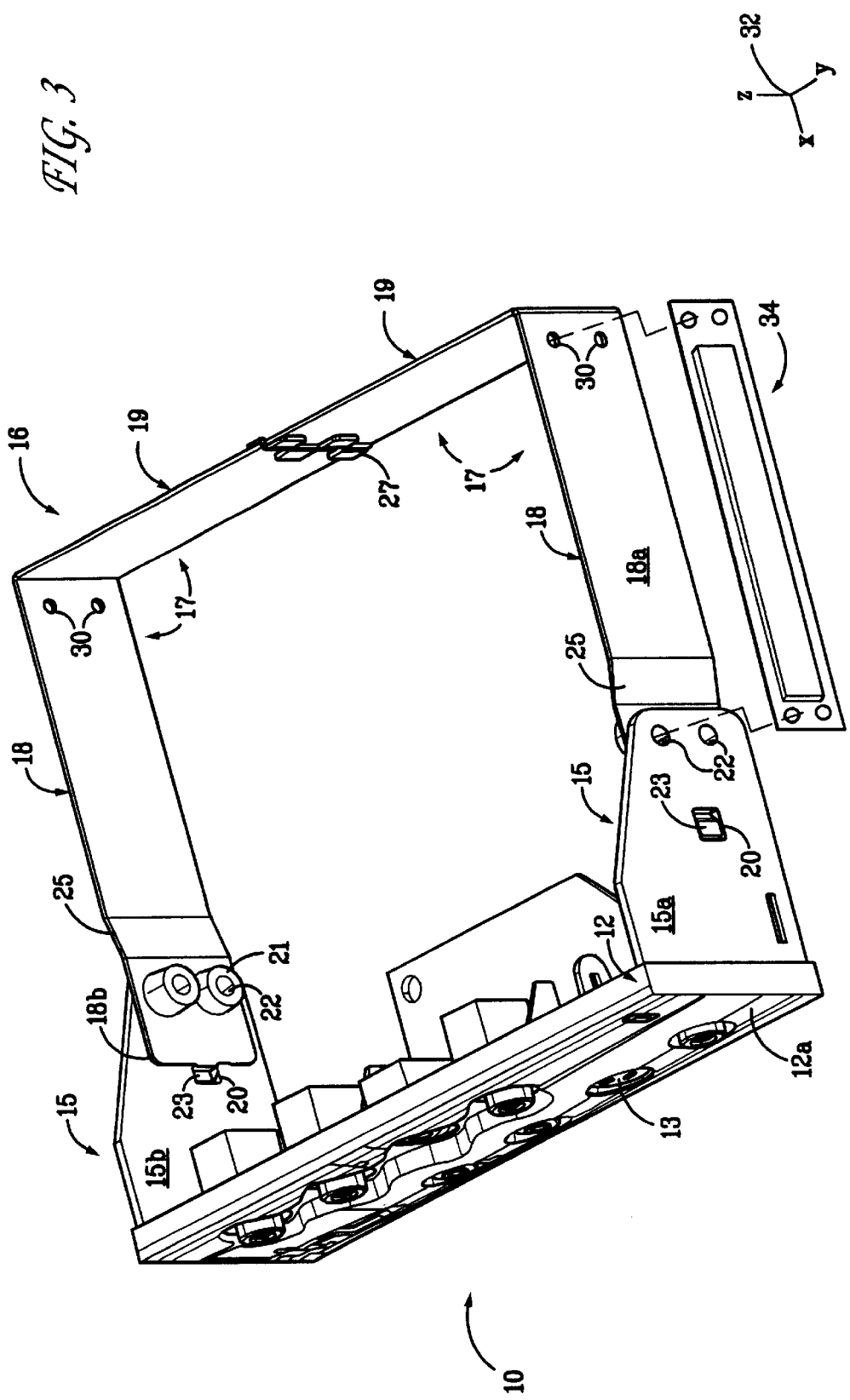
FIG. 3 is a top perspective view of the jack panel shown in FIG. 1
Figure 6:
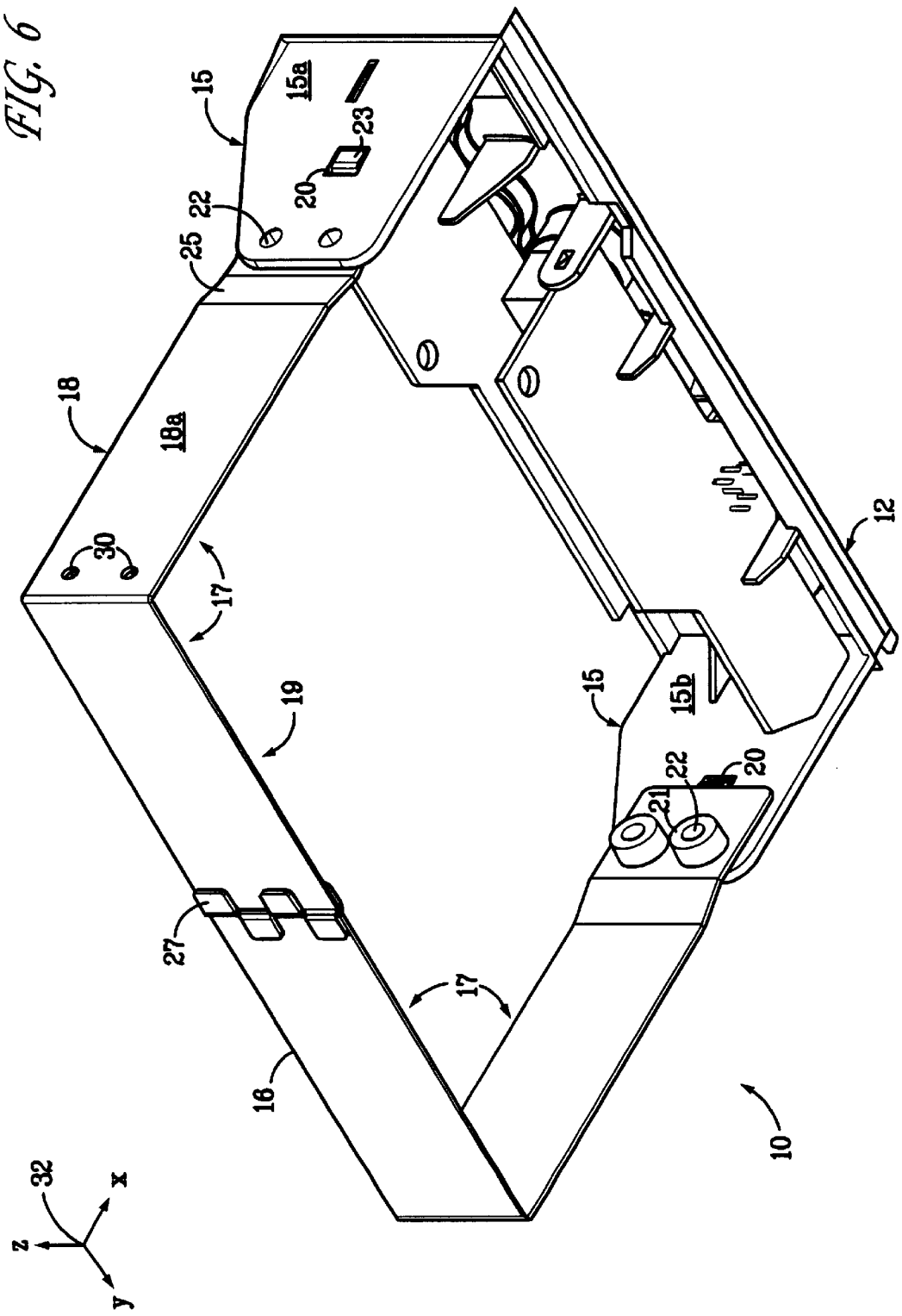
FIG. 6 is a bottom perspective view of the jack panel shown in FIGS. 1, 3 and 5.
Figure 9:
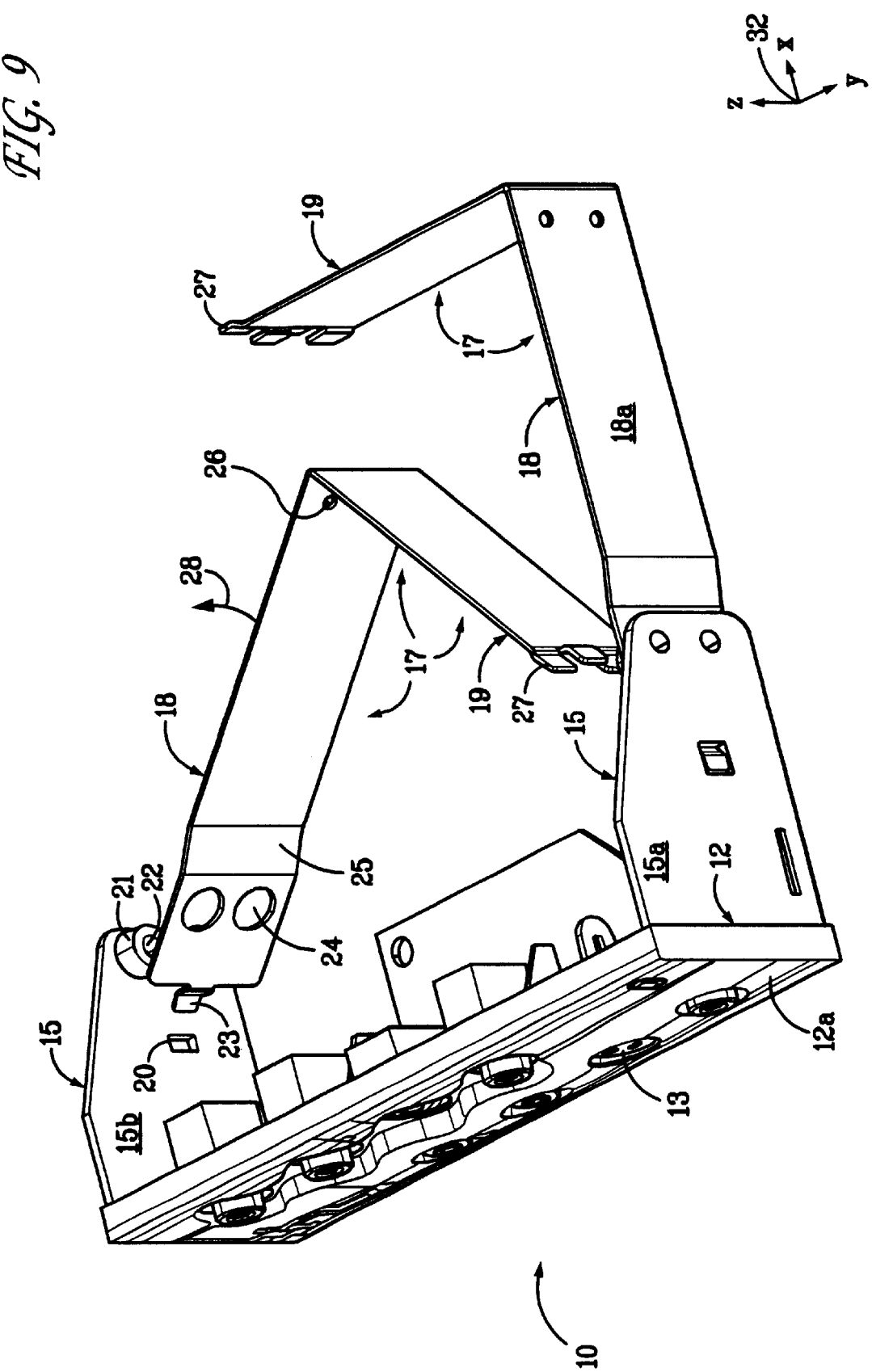
FIGS. 9–11 are top perspective views of the jack panel shown in show in FIGS. 1, 3, and 5–7, in various states of assembly.
Figure 10:
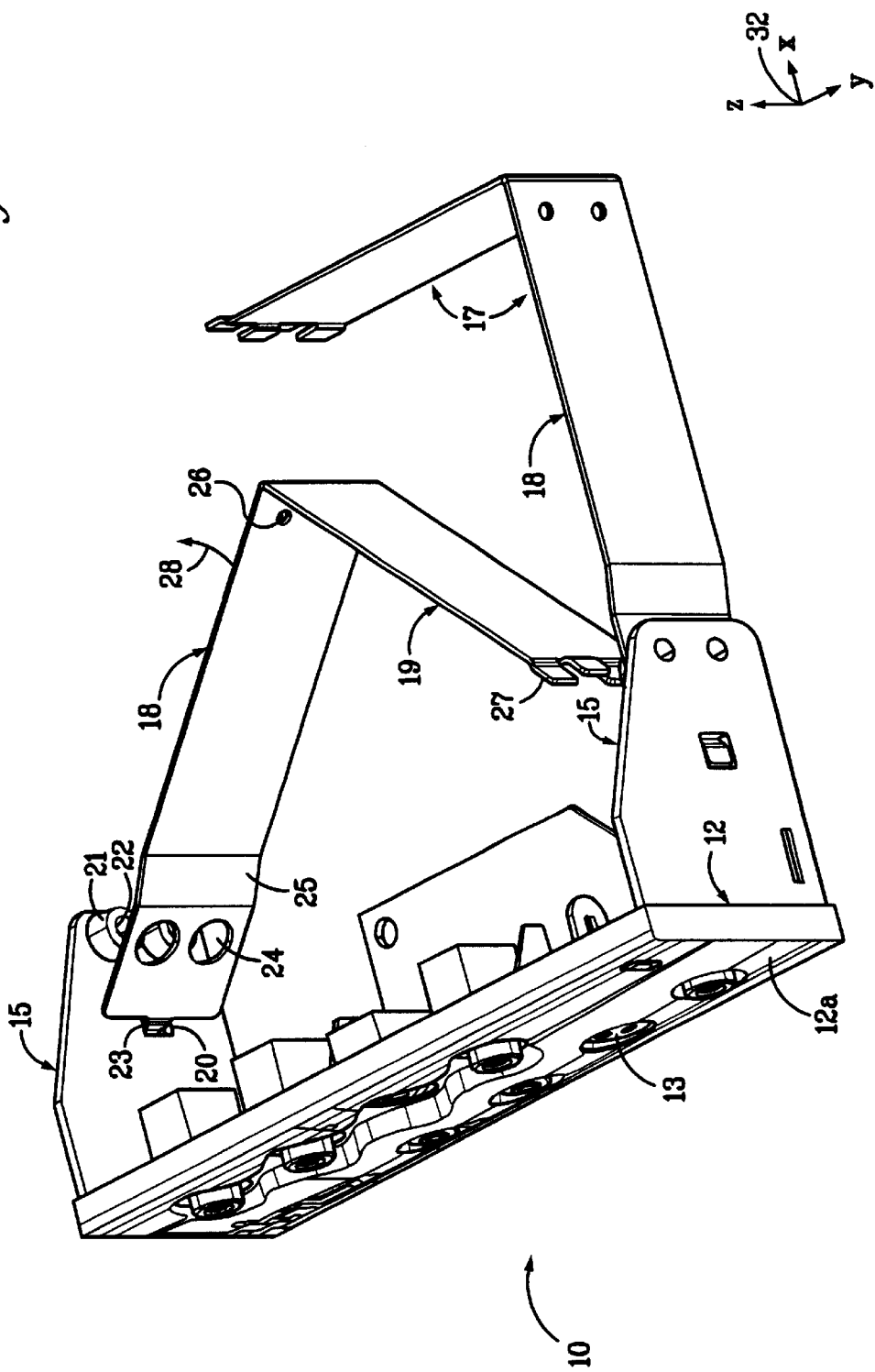
Figure 11:
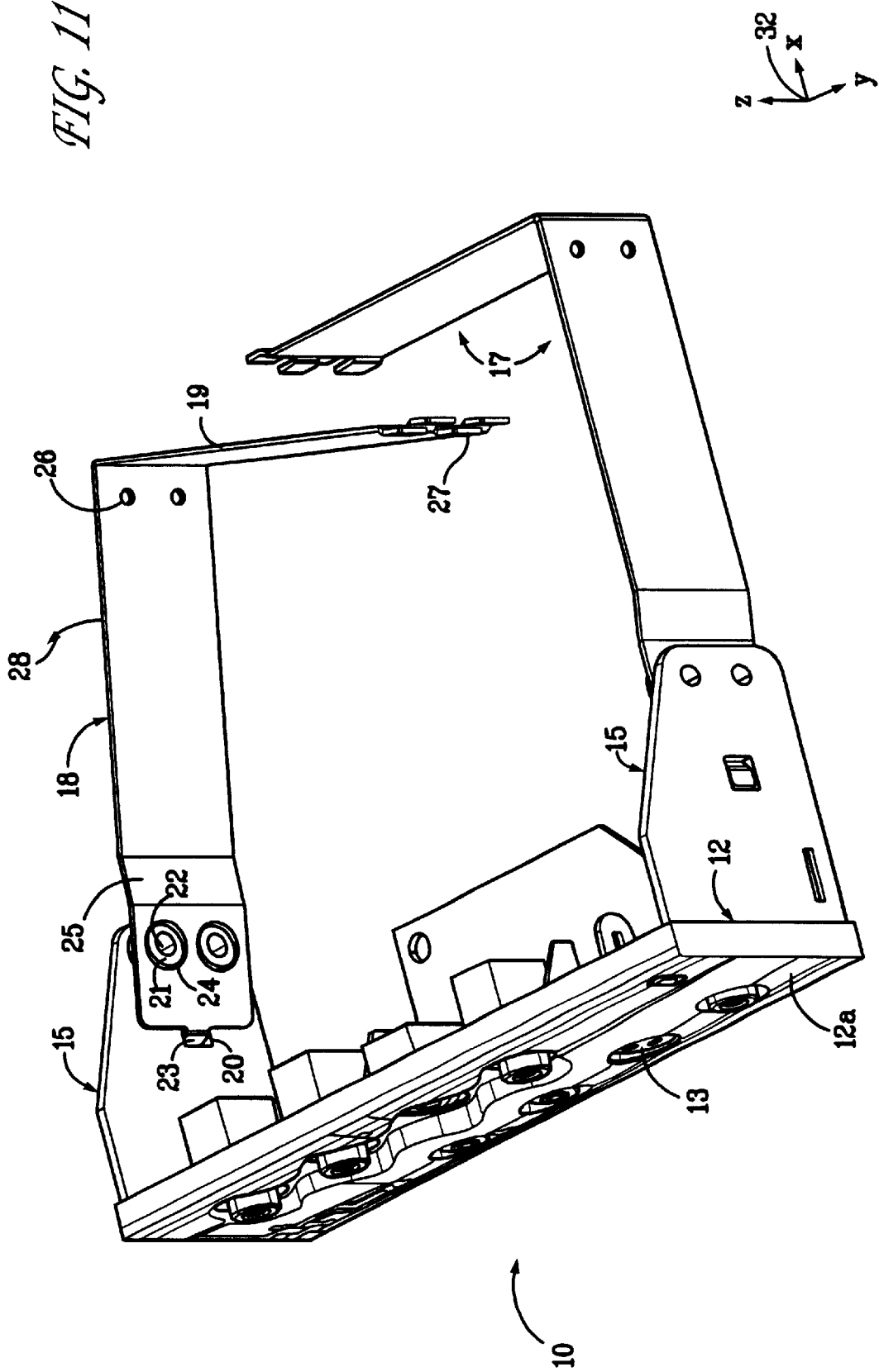

Panel 10 is configured for a rail-mount installation through a series of steps illustrated sequentially in FIGS. 9 through 11. Specifically, tab 23 is placed in aperture 20 of mounting plate 15. The relative locations of tab 23, projection 21, and aperture 20 require that tab 23 be inserted at an oblique angle, as shown in the figures. Insertion of tab 23 causes apertures 24 to substantially align with projections 21. Side plate 18 is then pivoted about tab 23, in the direction denoted by the arrow 28. Plate 18 is pivoted until the overlapping portions of plate 18 and mounting plate 15 lie substantially flush. Projections 21 become disposed within apertures 24 as side plate 18 is pivoted in this manner. This series of steps results in the coupling of mounting plate 15 and side plate 18 as shown in FIGS. 3, 5, and 6.

Angled portion 25 causes outer surface 15a of mounting plate 15 and an outer surface 18a of side plate 18 to lie substantially flush when plates 15 and 18 are coupled as noted. This relationship is best shown in FIG. 5. Furthermore, recess 20a in aperture 20 is sized to so that the depth (y dimension) of recess 20a substantially corresponds to the thickness (y dimension) of tab 23. Tab 23 thus lies substantially flush with outer surface 15a of mounting plate 15. Hence, surfaces 15a and 18a form a substantially smooth, flat area that accommodates mounting rails 34. A plurality of holes 30 are disposed in side plate 18, proximate rear plate 19. Holes 30, in conjunction with bores 22 in mounting plate 15, accommodate a fastening means (not shown) utilized to fix rails 34 to surfaces 15a and 18a.

Rear plates 19 are joined after mounting plates 15 and side plates 18 have been coupled as described above. Rear plates 19 are coupled via a series of interlocking tabs 27 disposed along an end of each plate 19. Each tab 27 is offset in a manner that allows tab 27 to slidably engage the opposing rear plate 19. This feature is best illustrated in FIGS. 4A through 4D and FIG. 6. Once tabs 27 are engaged, rear plates 19 can be decoupled only by applying opposing forces to both plates 19. Furthermore, these forces must be applied in directions that substantially coincide with the longitudinal (y) axis of each plate 19.

The coupling of rear plates 19 forms a rectangular frame comprising face plate 12, mounting plates 15, side plates 18, and rear plates 19. Engagement of projections 21 and apertures 24 inhibits relative movement between mounting plate 15 and side plate 18 in the vertical (z) direction. Relative movement in the axial (x) direction is also inhibited by the engagement of projections 21 and apertures 24. Relative movement between mounting plate 15 and side plate 18 in the lateral (y) direction is inhibited by the engagement of tab 23 and aperture 20, and by the overlap between plates 15 and 18. Hence, the coupling of mounting plates 15 and sub-frame 16 forms a rigid structural frame. This frame, when used in conjunction with mounting rails 34, furnishes a means for suspending panel 10 from rail-mounting slots (not shown) that may be disposed along the sides of bay 11a.

The above-noted framework can be assembled and dissembled without the use of screws, bolts, clamps, or other external fasteners. Forgoing the use of external fasteners allows jack panel 10 to be reconfigured for different mounting arrangements through a quick and simple procedure, and with a minimal expenditure of labor. Additionally, the number of parts needed to reconfigure jack panel 10 is relatively low, thereby minimizing the opportunity for parts to become lost, misplaced, or mispackaged. Furthermore, the assembly and disassembly processes can be performed without the use of any tooling.

Other advantages of the present invention arise from the ability to provide an accessory panel such as jack panel 10 that is compatible with both of the standard arrangements for mounting peripheral devices in computer bays. This compatibility allows substantially the entire market for a particular accessory panel to be served by a single version of the panel. Hence, the expenses associated with manufacturing, packaging, and marketing multiple versions of a single product can be eliminated through the use of the invention. Furthermore, a potential savings in inventory-related costs is made possible by the need to stock only one version of the product.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, unless expressly stated, the claims are not limited to applications involving electrical jack panels for use in 5-1/4-inch bays of desk-top computers.

What is claimed is:

1. An accessory panel capable of being configured for a first and a second type of mounting arrangement in a computer bay, comprising:
    a face plate;
    a mounting plate coupled to said face plate and having a first aperture formed therein, said mounting plate comprising a surface projection having a bore extending therethrough, said bore being adapted to receive a fastener when said accessory panel is configured for said first type of mounting arrangement; and
    a sub-frame having a second aperture formed therein, said sub frame comprising a first tab, at least a portion of said first tab being disposed within said first aperture and at least a portion of said surface projection being disposed within said second aperture so that said sub-frame is removably coupled to said mounting plate when said accessory panel is configured for said second type of mounting arrangement.

2. The accessory panel of claim 1, wherein said bore substantially aligns with a mounting hole in said computer bay when said accessory panel is configured for said first type of mounting arrangement and said panel is disposed within said bay.

3. The accessory panel of claim 1, wherein said accessory panel is adapted for use in a 5¼-inch computer bay.

4. The accessory panel of claim 1, wherein said accessory panel comprises two of said mounting plates disposed at opposing ends of said face plate.

5. The accessory panel of claim 1, wherein said accessory panel further comprises an electrical jack disposed on said face plate.

6. The accessory panel of claim 5, wherein said electrical jack is adapted to transmit video and audio signals.

7. The accessory panel of claim 1, wherein said sub-frame includes two of said second apertures and said mounting plate comprises two of said projections.

8. The accessory panel of claim 7, wherein said projections are vertically aligned.

9. The accessory panel of claim 1, wherein said sub-frame comprises a first sub-frame member and a second sub-frame member, said first and second sub-frame members being removably coupled when said accessory panel is configured for said second type of mounting arrangement.

10. The accessory panel of claim 9, wherein said first and second sub-frame members each comprise a side plate and an adjoining rear plate.

11. The accessory panel of claim 9, wherein said first and second sub-frame members are interchangeable.

12. The accessory panel of claim 9, wherein said first sub-frame member comprises a second tab, said second tab removably engaging said second sub-frame member when said first and second sub-frame members are removably coupled.

13. The accessory panel of claim 12, wherein said second sub-frame member comprises a third tab, said third tab removably engaging said first sub-frame member when said first and second sub-frame members are removably coupled.

14. A method for configuring an accessory panel for installation in a bay of a computer, comprising:
    removably coupling a first sub-frame member to a first mounting plate by inserting at least a portion of a first tab disposed on said first sub-frame member through an aperture disposed on said first mounting plate and pivoting said first sub-frame member until a surface of said first mounting plate lies substantially flush with a first surface of said first sub-frame member;
    removably coupling a second sub-frame member to a second mounting plate by inserting at least a portion of a second tab disposed on said second sub-frame member through an aperture disposed on said second mounting plate and pivoting said second sub-frame member until a surface of said second mounting plate lies substantially flush with a first surface of said second sub-frame member; and
    removably coupling said first and second sub-frame members by engaging a third tab disposed on a second surface of said first sub-frame member with a second surface of said second sub-frame member and engaging a fourth tab disposed on said second surface of said second sub-frame member with said second surface of said first sub-frame member.

* * * * *